United States Patent [19]
Turpin

[11] 3,827,071
[45] July 30, 1974

[54] CAMERAS

[76] Inventor: Gerald Leslie Turpin, Knoll Cottage, Fulmer Rd., Fulmer, England

[22] Filed: June 20, 1972

[21] Appl. No.: 264,586

[30] Foreign Application Priority Data
June 24, 1971  Great Britain.................... 29677/71

[52] U.S. Cl...................................... 95/1 R, 355/71
[51] Int. Cl........................................... G03b 27/76
[58] Field of Search........... 95/1; 355/68, 71, 32, 37

[56] References Cited
UNITED STATES PATENTS

| | | | |
|---|---|---|---|
| 2,352,914 | 7/1944 | Rackett | 355/37 |
| 3,102,450 | 9/1963 | Grossman | 355/68 |
| 3,323,429 | 6/1967 | Howard | 95/1 |
| 3,467,468 | 9/1969 | Johnson | 355/71 X |
| 3,523,728 | 8/1970 | Wick | 355/32 |
| 3,577,898 | 5/1971 | Bragg | 355/71 |

*Primary Examiner*—John M. Horan
*Attorney, Agent, or Firm*—Cushman, Darby & Cushman

[57] ABSTRACT

The drawings show a camera having a device for directing additional light of a selected colour and intensity directly into the camera aperture to modify a scene recorded on film in the camera.

10 Claims, 4 Drawing Figures

CAMERAS

BACKGROUND OF THE INVENTION

1. Field of the Invention

This invention relates to cameras and is particularly although not exclusively applicable to cinematograph cameras for colour photography.

2. Description of the Prior Art

Hitherto it has been known to pre or post expose a film to light of a particular colour prior to or after normal exposure of the film to modify the record on the film. A disadvantage of this technique is that the exposure used during exposing of a film may vary considerably but the pre- or post-exposure of the film does not vary correspondingly so that the effect of the pre- or post-exposure will not be consistent throughout the film.

A further disadvantage is that if different lenses are used in the camera during exposure of a colour film, the pre-flashing of the film cannot be varied to compensate for variations in colour transmissibility between the two lenses.

SUMMARY OF THE INVENTION

The invention provides a camera having lighting means for directing light of a required colour and intensity directly onto a light sensitive film within the camera during exposure of the film to record a scene, so that light reaching the film from the scene is supplemented by the light from said lighting means.

The invention also provides a method of photographing using a camera according to any of the above arrangements wherein a light sensitive film in the camera is exposed to light both from the scene to be recorded and to light of a required colour and intensity from said lighting means to modify the lighting of the scene as recorded on the film.

DESCRIPTION OF THE PREFERRED EMBODIMENTS

Figure 1:
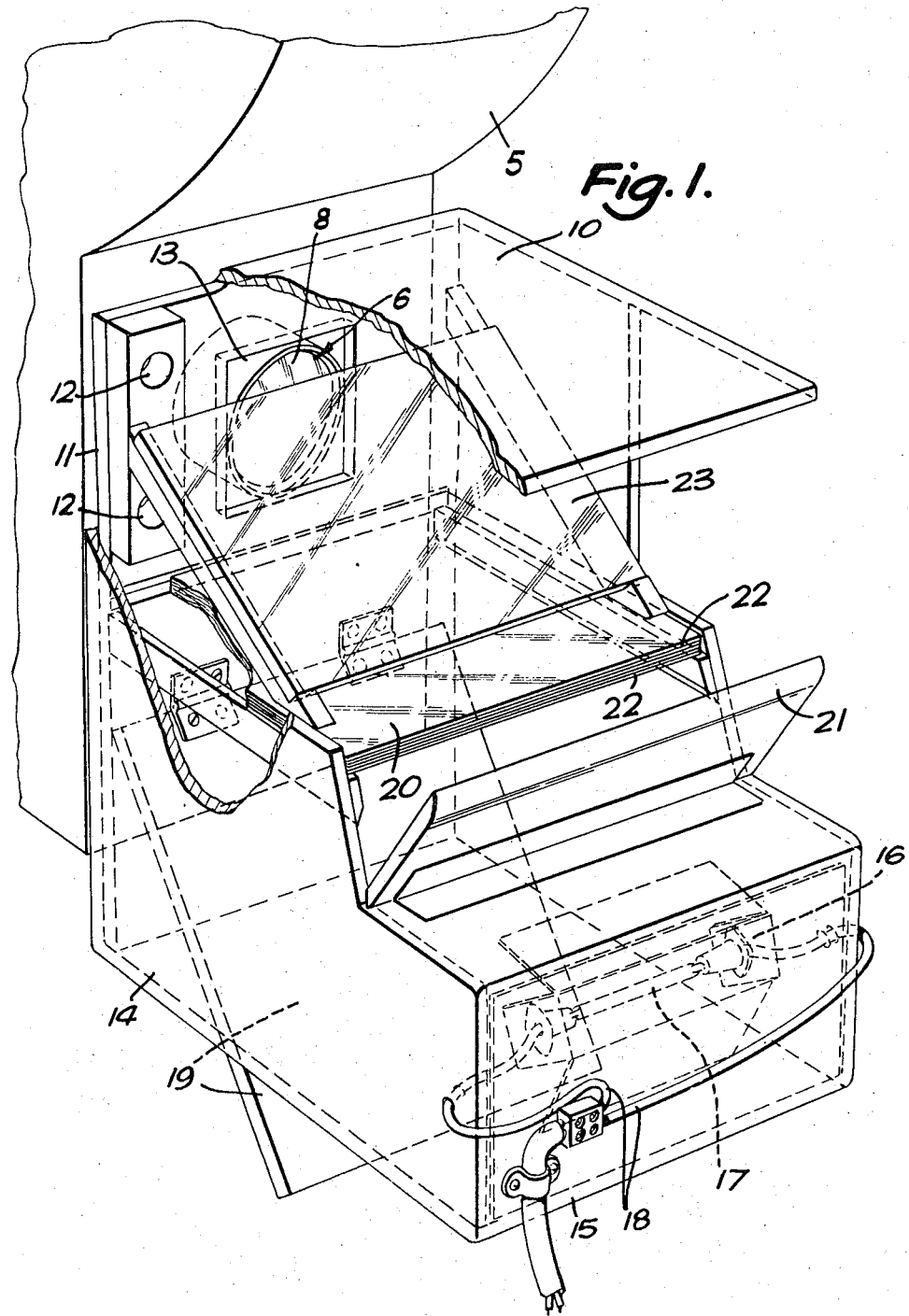
FIG. 1 is a perspective view, partly cut away, of a lighting device, for mounting on the front of a cinematograph camera.

The device comprises a hood 10 having a base 11 which is secured by bolts (not shown) through holes 12 to the front of a cinematograph camera indicated diagrammatically as 5 for colour photography. The base 11 has a square aperture 13 which registers with the normal front aperture 6 of the camera.

The hood is extended downwardly to form a box-shaped housing 14 open both at the top and the bottom. The housing has a front wall 15 on which a strip light assembly 16 containing a bulb 17 is mounted. The light is connected through leads 18 to a source of electric power and a control (not shown) is provided for operating a dimmer to vary the intensity of illumination of the light.

An upwardly inclined wall 19 is mounted at the back of the housing for reflecting light from the lamp 17 upwardly through the open top of the housing 14 into the hood. A filter 20 is mounted in the open top of the housing 14.

The front wall 15 of the housing has a hinged flap 21 to permit insertion of the desired filter in the top of the housing and to hold the filter in situ. The filter comprises two plain glass plates 22 between which there is a stack of four filter elements and above the filter elements there is a white diffuser. The four filter elements are orange, blue, pink and chocolate. The light emitted from the top of the filter 20 is a uniform sepia colour.

Located in the hood 10 is a glass plate 23 having optically flat faces. The faces of the plate are coated to prevent the formation of double images. The plate is inclined downwardly at 45° to the axis of the camera lens 8 located behind the aperture 12. Thus light from the screen 21 is reflected by the lower surface of the plate 23 through the aperture 13 into the camera. The plate 23 does not however affect the normal passage of light from a scene in front of the camera into the camera. Instead of glass the plate may be formed from another transparent material such as a plastics material.

Figure 2:
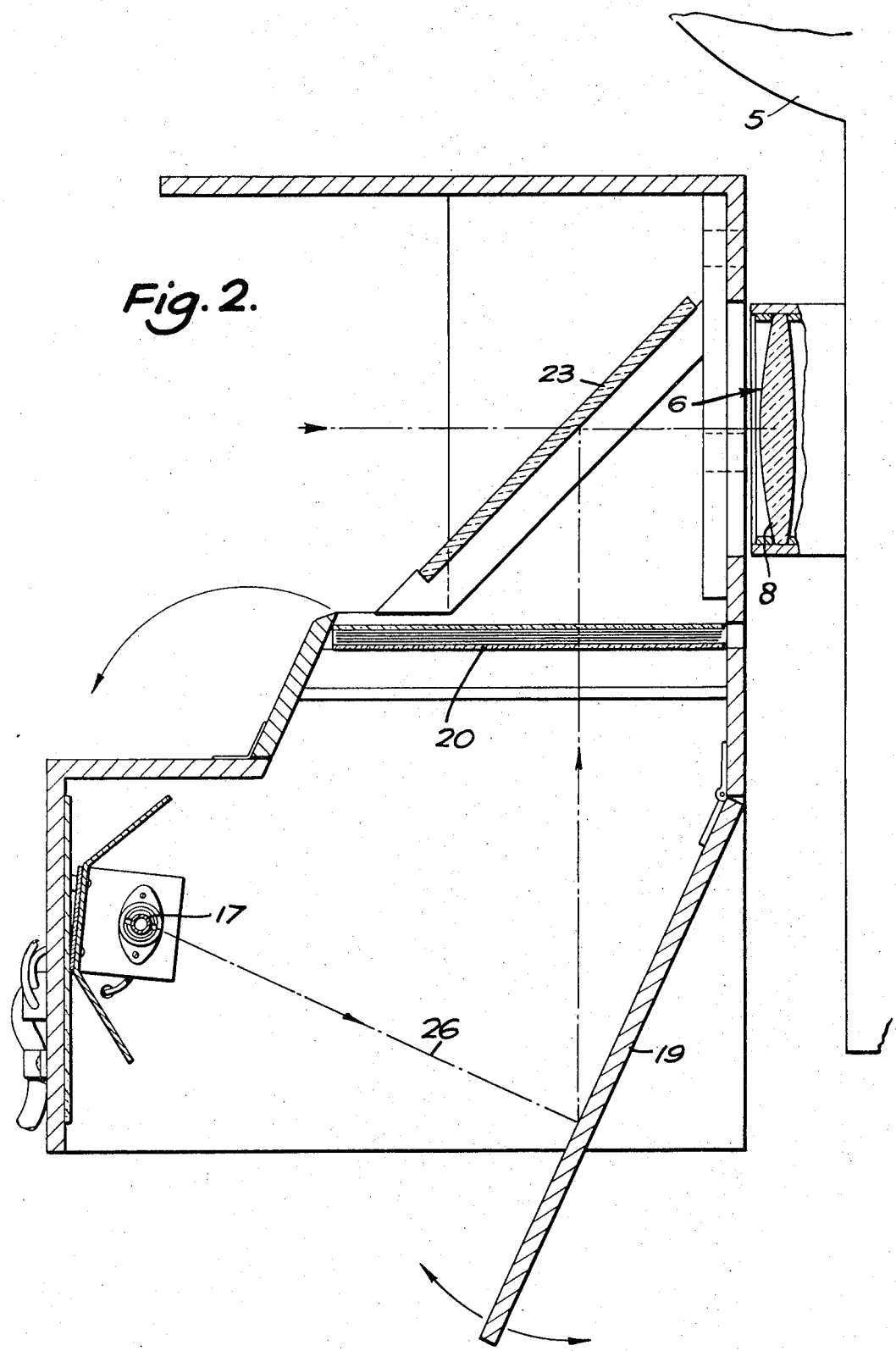
FIG. 2 is a sectional view through the device.

In FIG. 2 one light path 26 is shown leading from the lamp 17 to the panel 19 through the filter 20 to the plate 23 and thence into the camera. In use the intensity of light from the lamp 17 is adjusted until the sepia light visibly affects only the base tones of the scene being recorded by the camera. The addition of sepia light to the base tones of the scene as recorded by the camera gives the recorded scene a "period" effect.

Figure 3:
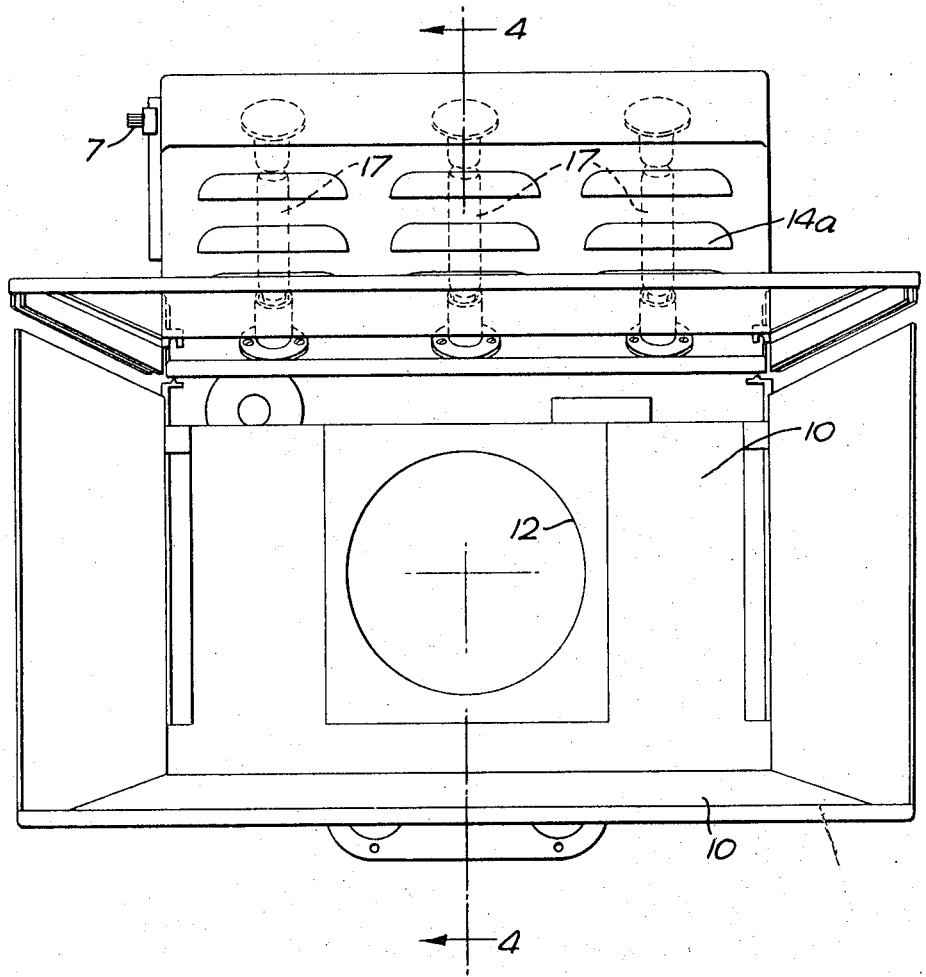
FIG. 3 is a plan view of a modified lighting device.
Figure 4:
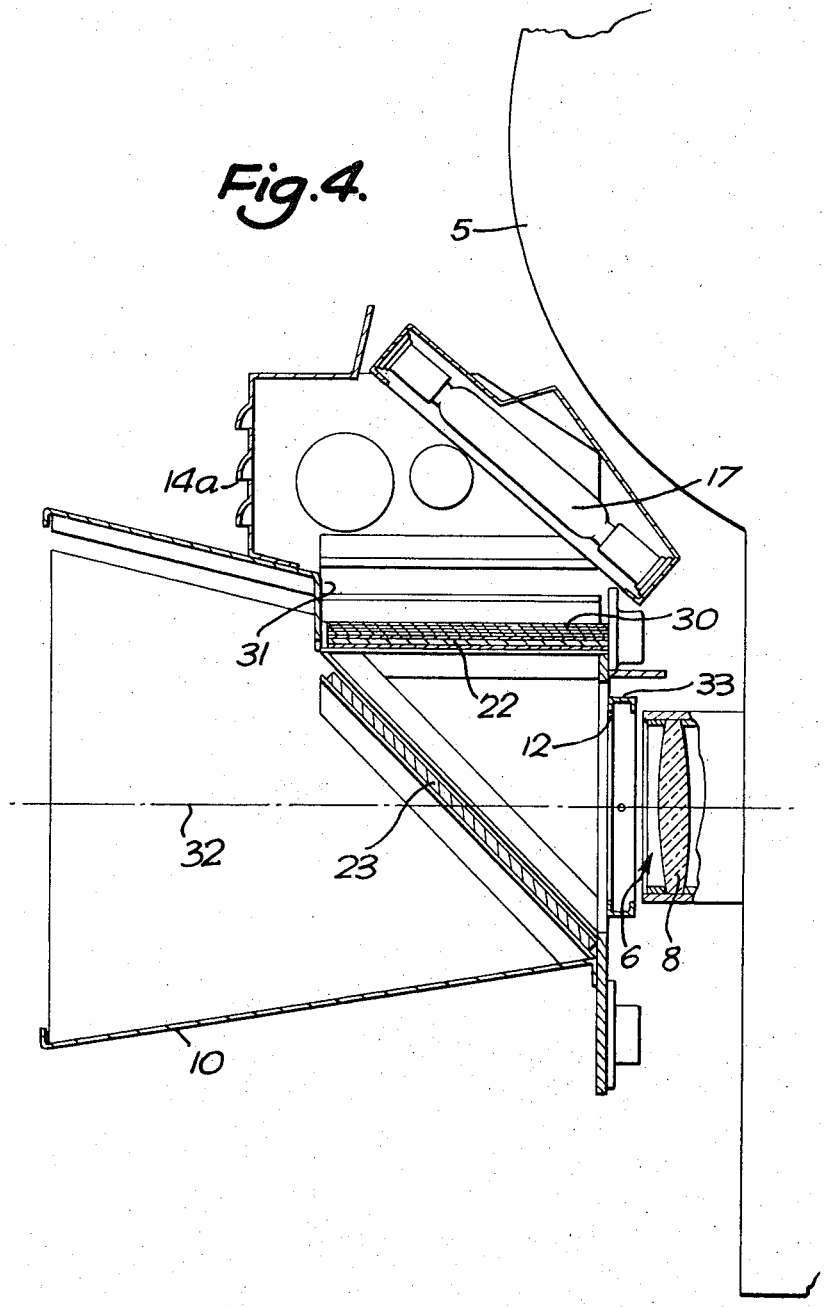
FIG. 4 is a section on the line 4—4 of FIG. 3.

FIGS. 3 and 4 of the drawings show an alternative construction which is similar in many respects to the embodiment described above and like parts have been allotted with the same reference numerals. The main difference is that the housing 14 containing the light source is mounted on top of the hood 10. The light source comprises three parallel 500 watt, 110 volt tungsten halogen bulbs 17. A dimmer is provided for the bulbs which is operated by a sliding knob 7. The housing 14 has louvres 14a to provide ventilation to the bulbs. The bulbs direct light downwardly through a flushed opal glass 30 mounted in an aperture 31 in the top of the hood. The filter pack 22 providing sepia coloured light is located immediately below the glass. As in the earlier described embodiment light from the filter pack is reflected into the camera lens (not shown) along the axis of the lens indicated at 32 by an optical flat glass 23 mounted in the hood at 45° to the lens axis. A further feature of hood 14 is a filter tray 33 mounted on the outside of the hood at the end of the hood which is attached to the camera to hold further filters over the aperture 12.

In practice it has been found that for indoor photography using a camera lens exposure of T4 and highlight illumination of 120 ft. candles the illumination from the bulbs 17 is required to provide 15 ft. candles measured at the reflector 23. The sepia coloured light affects only the base tones of the scene recorded on the film. The T stop is raised or lowered as required in accordance with the particular scene being filmed.

For outdoor photography, particularly in very bright light, three 1,000 watt bulbs may be used instead of the 500 watt bulbs. With a lens exposure of T22 the full power of the three 1,000 watt bulbs would be required which would generate excessive heat in the hood. In practice therefore a neutral density filter is mounted in guides (not shown) towards the front end of the hood 10. Using a 0.6 neutral density filter the exposure required can be cut from T22 to T11 and this permits the power required from the bulbs 17 to be reduced whilst giving the required affect of changing the base tones of the recorded scene without affecting the highlights of the scene. Where required a 0.3 filter can be used to cut the exposure by one stop and a 0.9 filter to cut the exposure by three stops.

Instead of using a separate neutral density filter, the plate glass 23 can be replaced by an optically flat neutral density glass of either 0.3, 0.6 or 0.9 according to the reduction required in the exposure.

A fan driven by an electric motor may be provided in the housing for the bulbs to supply cooling air to the bulbs and thereby prevent overheating of the bulbs.

The dimmer control 7 may be provided with a calibrated scale in foot candles or "F" stops to correspond with different lens exposures for a set of bulbs of a particular power. Thus as the lighting of the scene to be recorded changes requiring a change in camera exposure, the intensity of light from the bulbs 17 can be readily changed in accordance.

Also battery powered bulbs may be used instead of mains power in which case the number and arrangement of bulbs may be varied from that shown in order to obtain even illumination. Again a calibrated dimmer may be used.

In a further modification the filter pack 20 is replaced by a dichroic filter suitably angled with respect to the direction of the beam of light from the bulbs 17 to direct a selected colour from the beam onto the reflector.

Although the above embodiments of the invention relates to cinematograph cameras the invention is equally applicable to small cine cameras and also to still cameras. It will be appreciated that the hood is constructed to suit the particular camera on which it is to be mounted.

Also other effects may be obtained using different filters and/or light intensities to vary the base tones only or both base tones and highlights of a scene as recorded on film. For example it has been found that by adding light which may be white or coloured during photographing of a poorly lit scene, the additional light increases the speed of the film which has the effect of bringing out latent images on the film which would normally not photograph.

I claim:

1. In a camera having a hollow body, a film plane within the body and an imaging lens supported by the body to direct light from a scene being photographed onto the film plane, the improvement which comprises: a housing disposed in front of the imaging lens and having an aperture therein to permit light from the field of vision of the lens to reach the lens, an electric light source disposed outside the field of vision of the lens and carried by the housing, means for varying the intensity of the light produced by said source, a transparent reflector carried by the housing in a position in front of the lens such that light from the light source is reflected from a surface of the reflector through the lens while light from the scene being photographed passes through the reflector to the lens.

2. A camera as claimed in claim 1 wherein the reflector is a sheet of plate glass arranged across the field of vision of the aperture so that light from said source is reflected by one face of the glass into the aperture.

3. A camera as claimed in claim 2 wherein the plate glass has optically flat surfaces.

4. A camera as claimed in claim 1 wherein the source of light comprises a source of white light and a filter of the colour required through which light from the source is directed prior to reaching the reflector.

5. A camera as claimed in claim 4 wherein the filter comprises one or more coloured elements to provide the required colour.

6. A camera as claimed in claim 4 wherein the ilter is a dichroic filter arranged to select from the source of light the required colour and to direct said required colour into the reflector.

7. A camera as claimed in claim 1 wherein the means to vary the intensity of light comprise means to vary the power supplied to the light source.

8. A camera as claimed in claim 1 wherein said light source is located in a housing secured to the camera, the housing having an opening in front of the camera aperture to permit light from the field of vision of the aperture to reach the aperture.

9. A camera as claimed in claim 1 wherein the camera is a cinematograph camera.

10. A camera as claimed in claim 1 wherein the camera is a "still" camera.

* * * * *